United States Patent
Zhong

(10) Patent No.: US 8,908,142 B2
(45) Date of Patent: Dec. 9, 2014

(54) LIQUID CRYSTAL PANEL AND MANUFACTURING METHOD THEREOF

(75) Inventor: Xinhui Zhong, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 249 days.

(21) Appl. No.: 13/578,700

(22) PCT Filed: Jun. 21, 2012

(86) PCT No.: PCT/CN2012/077289
§ 371 (c)(1),
(2), (4) Date: Aug. 13, 2012

(87) PCT Pub. No.: WO2013/185371
PCT Pub. Date: Dec. 19, 2013

(65) Prior Publication Data
US 2013/0329178 A1 Dec. 12, 2013

(30) Foreign Application Priority Data
Jun. 12, 2012 (CN) .......................... 2012 1 0192607

(51) Int. Cl.
*G02F 1/1339* (2006.01)
*G02F 1/13* (2006.01)
(52) U.S. Cl.
USPC ............................. 349/190; 349/187; 349/153
(58) Field of Classification Search
USPC .......................................... 349/153, 187, 190
See application file for complete search history.

(56) References Cited

U.S. PATENT DOCUMENTS 6,466,294 B1 * 10/2002 Yamagishi et al. ............ 349/155
2011/0080541 A1 * 4/2011 Hsieh et al. ..................... 349/88

FOREIGN PATENT DOCUMENTS

| CN | 101158768 | A | 4/2008 |
| CN | 101561591 | A | 10/2009 |
| CN | 101561592 | A | 10/2009 |
| CN | 101653040 | A | 2/2010 |
| CN | 102203026 | A | 9/2011 |
| JP | H11167092 | A | 6/1999 |

OTHER PUBLICATIONS

Chinese Office Action issued in corresponding application No. 201210192607.5 on Apr. 1, 2014.
International Search Report issued in corresponding application No. PCT/CN2012/077289 mailed Mar. 21, 2013.

* cited by examiner

*Primary Examiner* — Wen-Ying P Chen
(74) *Attorney, Agent, or Firm* — Carter, DeLuca, Farrell & Schmidt, LLP

(57) ABSTRACT

A manufacturing method of a liquid crystal panel, including: manufacturing a first substrate and a second substrate; mixing sealant with alloy particles having low melting points, coating the mixture on the first substrate, and dropping liquid crystals on the first substrate; and bonding the first substrate and the second substrate, heating the two bonded substrates, and then cooling the substrates. Therefore, the manufacturing method can prevent the present golden balls from piercing the common electrodes and further prevent the short circuit of the circuit on the substrate, which improves the yield rate of the liquid crystal panel. Additionally, since the alloy particles are small sized, after the separate alloy particles melt, contacting points between the alloy particles and the common electrodes are increased. Also, contacting resistance between alloy particles, and the contacting resistance between the alloy particles and the substrate are reduced, which improves the conductivity between the common electrodes.

9 Claims, 5 Drawing Sheets

LIQUID CRYSTAL PANEL AND MANUFACTURING METHOD THEREOF

BACKGROUND

1. Technical Field

The present disclosure relates to liquid crystal displaying technologies and, particularly, to a liquid crystal panel and a manufacturing method thereof.

2. Description of Related Art

Referring to FIG. 1, which is a schematic view of a present liquid crystal panel. The liquid crystal panel includes a first substrate 8, a second substrate 9, and a liquid crystal layer 6 sandwiched between the first substrate 8 and the second substrate 9. A glass substrate 80 is filmed, developed, and etched to form the first substrate 8 which has electrical structures such as thin film transistors (not shown), an array common electrode 81, and array pixel electrodes 82. Another glass substrate 90 is coated and developed to form the second substrate 90 having structures including a black matrix 91, a color filter 92, spacers (not shown) between the two substrates, and a color filter (CF) common electrode 93 (the pixel electrode on the second substrate 9). The array pixel electrodes 82 and the CF common electrode 93 form a liquid crystal capacitor, which is capable of forming an electric filed for driving the liquid crystal layer 6. In order to reduce the influence from the leakage of electricity from the liquid crystal capacitor, a storage capacitor is generally formed on the first substrate 8 for being connected to the liquid crystal capacitor. The storage capacitor is formed by the array common electrode 81 and the array pixel electrode 82. In order to keep the array common electrode 81 and the CF common electrode 93 in the same potential, the common electrodes of the first substrate 8 and the second substrate 9 need to be conducted to each other on a predetermined position of the two substrates 8 and 9.

At present, in order to conduct the common electrodes of the first substrate 8 and the second substrate 9, conductive golden balls 7 are often mixed into sealant and the mixture is coated on a predetermined position of the first substrate 8. In the process of bonding the two substrates, an outer force is applied to the two substrates to allow the golden balls 7 to fully contact the array common electrode 81 and the CF common electrode 93, thereby conducting the common electrodes of the two substrates.

Referring to FIG. 2, the structure of the golden ball used in the present liquid crystal panel is schematically shown. The golden ball 7 includes an elastic polymer ball 71 and at least one metal layer 72 covered on a surface of the polymer ball 71. Preferably, the outmost metal layer 72 is generally made of gold having high conductivity. In the process of bonding the first substrate 8 and the second substrate 9, the outer force applied to the two substrates and the size of the golden ball play an important role on the quality and yield rate of the liquid crystal panel. When the outer force applied to the two substrates is appropriate and the golden balls are pressed by a moderate degree, the golden balls fully contact with the common electrodes of the two substrates, the common electrodes can be fully conducted. If the outer force applied to the golden balls is too small or the diameters of the golden balls 7 vary widely, most of the golden balls cannot conduct the common electrodes. If the outer force applied to the two substrates is too large, the golden balls may be cracked. In this way, the golden balls may be incapable of conducting the common electrodes and may further pierce the common electrodes to result in the short circuit of the circuit on the first substrate. Therefore, it is desirable to control the outer force applied to the two substrates in the bonding process accurately. Additionally, the present golden ball is required to be elastic and conductive, which results in the complicate multi-layer structure of the golden ball. Since an inner portion of the golden ball is made of elastic polymer and is covered by at least one metal layer on the surface thereof, the sizes of all the golden balls are required to be closed to each other, and the diameter of each of the golden balls cannot be oversized, therefore, the manufacturing process and the picking process of the golden balls are complicated, which increases the manufacturing cost of the golden balls.

SUMMARY

One object of the present disclosure is to provide a manufacturing method of a liquid crystal panel. The manufacturing method includes:

manufacturing a first substrate and a second substrate;

mixing sealant with a number of alloy particles having low melting points, coating the mixture on the first substrate, and dropping liquid crystals on the first substrate; and bonding the first substrate and the second substrate, heating the two bonded substrates, and then cooling the two bonded substrates.

Preferably, the mixture of the sealant and the alloy particles is coated on an edge of the first substrate, or is coated on four corners of the first substrate, or is coated on a predetermined position on which the mixture is capable of conducting common electrodes of the first substrate and the second substrate.

Preferably, the step of heating the two bonded substrates, and then cooling the two bonded substrates includes: irradiating the two bonded substrates at the position on which the mixture is coated by ultraviolet light; and placing the substrates on a heating device, heating the substrates at a first predetermined temperature and then heating the substrates at a second predetermined temperature higher than the first predetermined temperature, and then cooling the substrates.

Preferably, the first predetermined temperature is 120 centigrade and the second predetermined temperature is 150 centigrade.

Preferably, the step of heating the two bonded substrates and then cooling the two bonded substrates includes: irradiating the two bonded substrates at the position on which the mixture is coated by ultraviolet light; placing the substrates on a heating device and heating the substrates at a first predetermined temperature; and scanning the substrates at the position on which the mixture is coated and then cooling the substrates.

Preferably, the weight ratio of the alloy particles to the sealant ranges from 0.5:100 and 50:100.

Preferably, the weight ratio of the alloy particles to the sealant ranges from 2:100 and 10:100.

Preferably, the alloy particles are placed together with the sealant and are mixed into the sealant by manual operation or by machines.

Preferably, the alloy particles are mixed with the sealant in the following methods: mixing the alloy particles having low melting points with the sealant, and adding a certain amount of solvent into the mixture; and after the alloy particles are mixed into the sealant, heating the mixture at a temperature lower than the melting point of the alloy particle and draining the solvent.

Preferably, a diameter of each of the alloy particles is less than or equal to the distance between the first substrate and the second substrate.

Preferably, the alloy particles are rotundity-shaped, or ellipsoid-shaped, or piece-shaped, or plate-shaped.

Preferably, the alloy particles are made of one or more kinds of material selected from the group consisting of Bi, Sn, Pb, In, and Cr.

Another object of the present disclosure is to provide a liquid crystal panel. The liquid crystal panel includes a first substrate, a second substrate, a liquid crystal layer sandwiched between the first substrate and the second substrate, a sealant coated on the first substrate; and a number of alloy particles having low melting points mixed with the sealant.

Preferably, the sealant with the alloy particles being mixed therein is coated on an edge of the first substrate, or is coated on four corners of the first substrate, or is coated on a predetermined position of the first substrate on which the sealant with the alloy particles being mixed therein is capable of conducting common electrodes of the first substrate and the second substrate.

Preferably, a diameter of each of the alloy particles is less than or equal to the distance between the first substrate and the second substrate.

Preferably, the weight ratio of the alloy particles to the sealant ranges from 0.5:100 to 50:100.

Preferably, the weight ratio of the alloy particles to the sealant ranges from 2:100 to 10:100.

Preferably, the alloy particles are rotundity-shaped, or ellipsoid-shaped, or piece-shaped, or plate-shaped.

Preferably, the alloy particles are made of one or more kinds of material selected from the group consisting of Bi, Sn, Pb, In, and Cr.

By mixing the alloy particles having low melting points with the sealant, coating the mixture on the predetermined position of the first substrate, and heating the mixture at a high temperature in the following process, the separate alloy particles can melt to form larger alloy ones, thereby conducting the common electrodes of the two substrates of the liquid crystal panel. Therefore, the manufacturing method of the present disclosure can prevent the situation where the present golden balls pierce the common electrodes and further cause the short circuit of the circuit on the substrate, which improves the yield rate of the liquid crystal panel. Additionally, since the alloy particles are small sized, after the separate alloy particles melt, the contacting area between the alloy particles and the common electrodes are increased. Also, the contacting resistance between alloy particles, and the contacting resistance between the alloy particles and the substrate are reduced, which improves the conductivity between the common electrodes of the two substrates. Since each of the alloy particles is simply structured, and the manufacturing process thereof is also simple, the manufacturing cost of the liquid crystal panel thus can be reduced.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
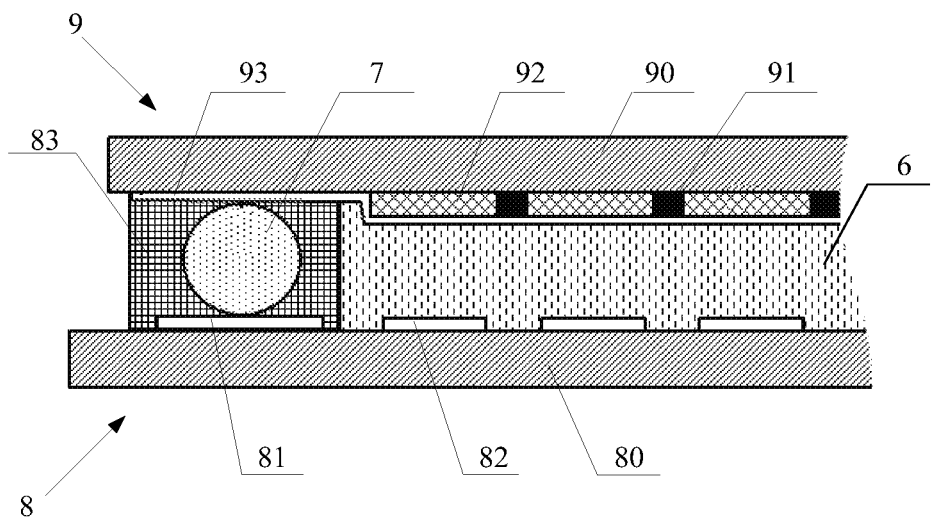
FIG. 1 is a schematic view of a present liquid crystal panel.
Figure 2:
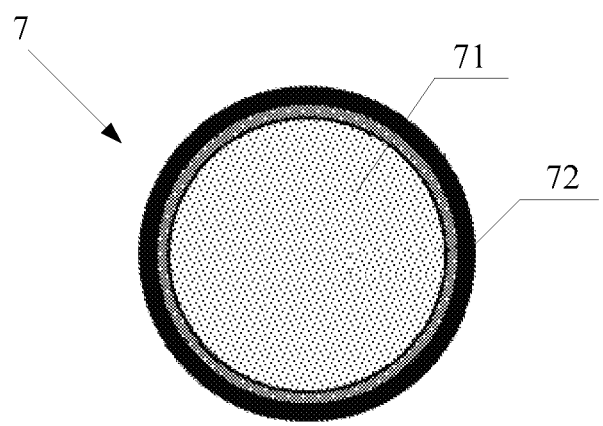
FIG. 2 is a schematic view of a golden ball used in the liquid crystal panel of FIG. 1.

Referring to FIG. 1, the main technical solution of the present disclosure is: mixing alloy particles having low melting points with sealant, and then coating the mixture on a predetermined position of the substrates. After the array substrate is bonded to color filter (CF) substrate, melting the separate alloy particles to form relatively larger alloy ones in the following high temperature heating process, thereby conducting common electrodes of the two substrates.

Figure 3:
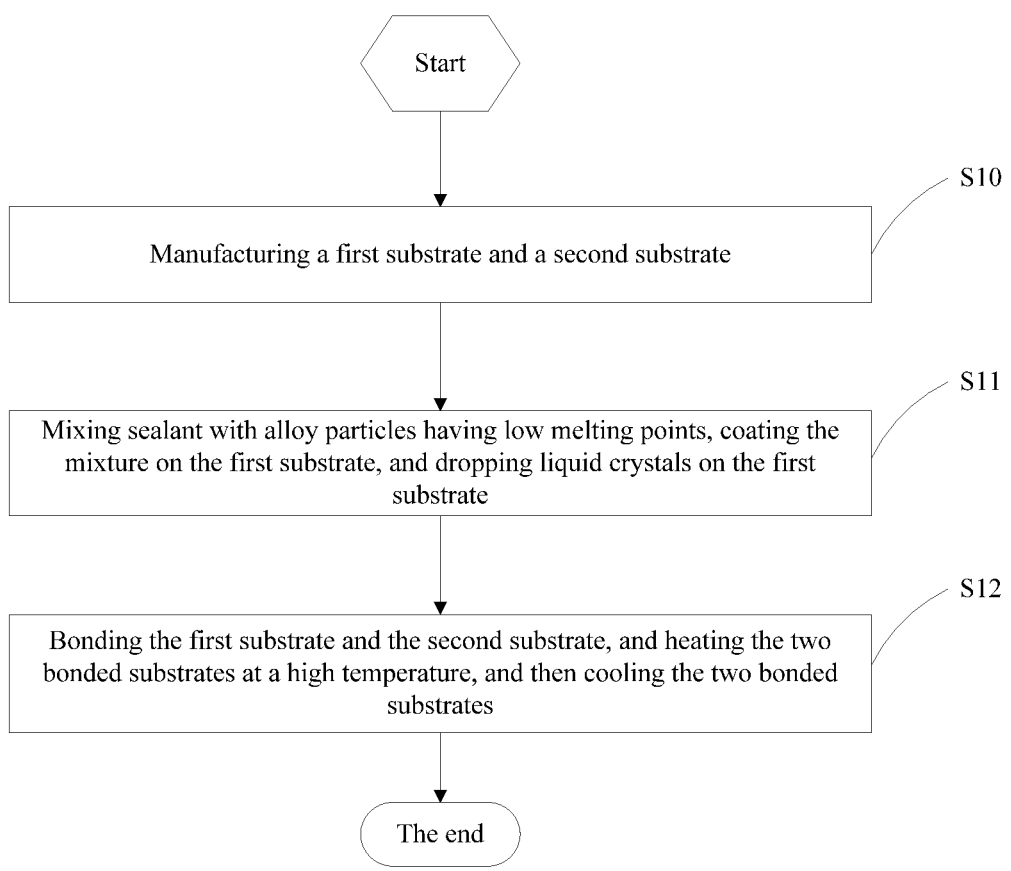
FIG. 3 is a flow chart of a manufacturing method of a liquid crystal panel in accordance with an embodiment of the present disclosure.

Referring to FIG. 3, which is a flow chart of a manufacturing method of a liquid crystal panel. The manufacturing method includes the following steps:

Step S10, manufacturing a first substrate and a second substrate. The first substrate is an array substrate and includes a first glass substrate, a TFT array, a common electrode, pixel electrodes and an alignment layer. The first glass substrate is filmed, developed, and etched to form the TFT array. The alignment layer is coated on a surface of the first substrate. The second substrate is a CF (color filter) substrate and includes a second glass substrate. The second substrate further includes a black matrix, spacers between the two substrates, a CF common electrode formed on the second glass substrate and an alignment layer. The alignment layer is formed on a surface of the second substrate.

Step S11, mixing sealant with alloy particles having low melting points, coating the mixture on the first substrate, and dropping liquid crystals on the first substrate.

The alloy particles having low melting points are made of alloy having a melting point lower than 200 centigrade, such as metal having low melting point including but not limited to Bi, Sn, Pb, In, and Cr. The alloy particles may be of same size or different size. Additionally, a diameter of each of the alloy particles is no more than the distance between the first substrate and the second substrate. That is, the diameter of each of the alloy particles is less than or equal to the distance between the first and second substrates. After the sealant is mixed with the alloy particles, the mixture is coated on the first substrate, and the liquid crystals are dropped on the first substrate.

Step S12, bonding the first substrate and the second substrate, and heating the two bonded substrates at a high temperature, and then cooling the two bonded substrates.

After the first substrate and the second substrate are vacuum bonded together, the two substrates are heated at a high temperature for melting the alloy particles. Thus, the melted alloy particles can form relatively larger alloy ones which are capable of conducting the common electrodes of the first substrate and the second substrate.

By mixing the alloy particles having low melting points with the sealant, coating the mixture on the predetermined position of the first substrate, and heating the two bonded substrates at a high temperature in the following process, the separate alloy particles can melt to form larger alloy ones, thereby conducting the common electrodes of the two substrates of the liquid crystal panel. Therefore, the manufacturing method of the present disclosure can prevent the situation where the present golden balls pierce the common electrodes and further cause the short circuit of the circuit on the substrate, which improves the yield rate of the liquid crystal panel. Additionally, after the separate alloy particles melt, contacting points between the alloy particles and the common electrodes are increased. Also, contacting resistance between alloy particles, and the contacting resistance between the alloy particles and the substrate are reduced, which improves the conductivity between the common electrodes of the two substrates. Since each of the alloy particles is simply structured, and the manufacturing process thereof is also simple, the manufacturing cost of the liquid crystal panel thus can be reduced.

Furthermore, the predetermined position of the first substrate where the mixture of the sealant and the alloy particles is coated may be varied in different embodiments. For example, in a first embodiment, after the alloy particles are mixed with the sealant, the mixture can be coated on an edge of the first substrate, thereby allowing the sealant in the mixture to seal the liquid crystal panel and allowing the mixture to conduct the common electrodes of the first and second substrates. In another embodiment, after the alloy particles are mixed with the sealant, the mixture can be coated on a predetermined position of the first substrate, for example, coated on the edge of the first substrate or on a position on which the mixture is capable of conducting the common electrodes of the first and second substrates. Purified sealant (that is, sealant not being mixed with the alloy particles) can be coated on other positions of the edge of the first substrate.

Figure 4:
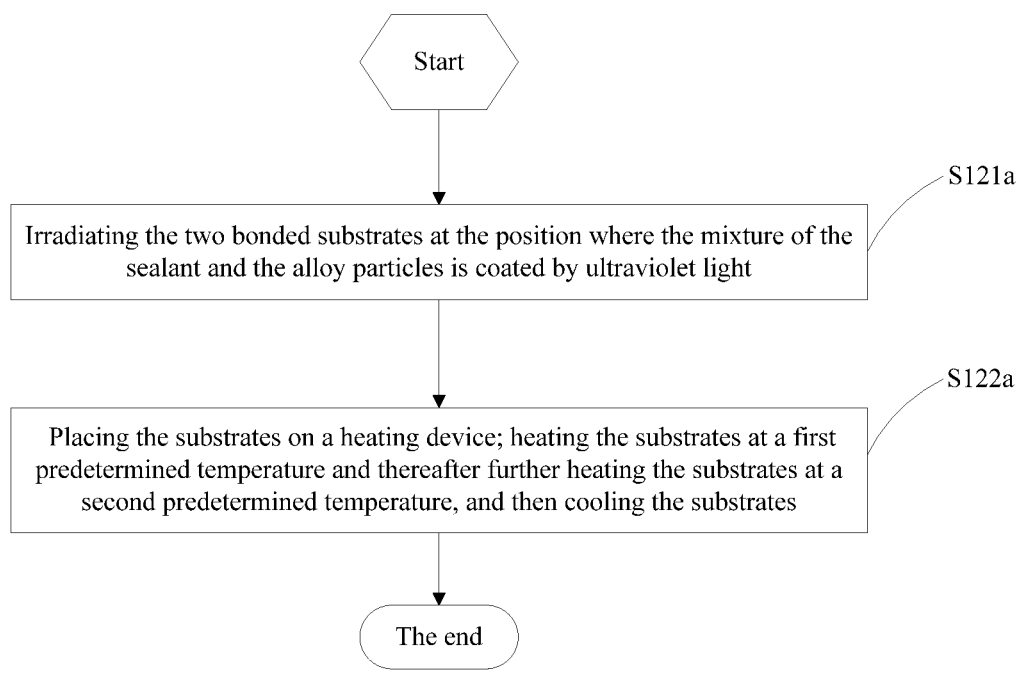
FIG. 4 is a flow chart of the step of heating the substrates of the liquid crystal panel at a high temperature of the manufacturing method of FIG. 3 in accordance with a first embodiment.

Furthermore, the step of heating the two bonded substrates may be varied in different embodiments. Referring to FIG. 4, which is a flow chart of the step of heating the two bonded substrates at a high temperature of the manufacturing method of the liquid crystal panel. In the embodiment, the step S12 specifically includes:

Step S121*a*, irradiating the two bonded substrates at the position where the mixture of the sealant and the alloy particles is coated by ultraviolet light.

Step S122*a*, placing the substrates on a heating device; heating the substrates at a first predetermined temperature and thereafter further heating the substrates at a second predetermined temperature which is lower than the first predetermined high temperature, and then cooling the substrates.

Firstly, irradiating the two bonded substrates at the position where the mixture of the sealant and the alloy particles is coated, thereby partly curing the sealant. Secondly, placing the substrates on the heating device such as an oven and heating the substrates at the first predetermined temperature to completely cure the sealant. Finally, heating the substrates at the second predetermined temperature, thereby melting the alloy particles in the mixture to form larger alloy ones after the mixture is cooled. It is understood that the first predetermined temperature is required to be high enough to completely cure the sealant and the second predetermined temperature is required to be high enough to completely melt the alloy particles, and the first predetermined temperature and the second temperature can be adjusted according to requirements in different situations. Additionally, the heating time of the substrates can be set according to the experience of the skilled one in the filed. In the embodiment, the first temperature is 120 centigrade, and the second predetermined temperature is 150 centigrade.

Figure 5:
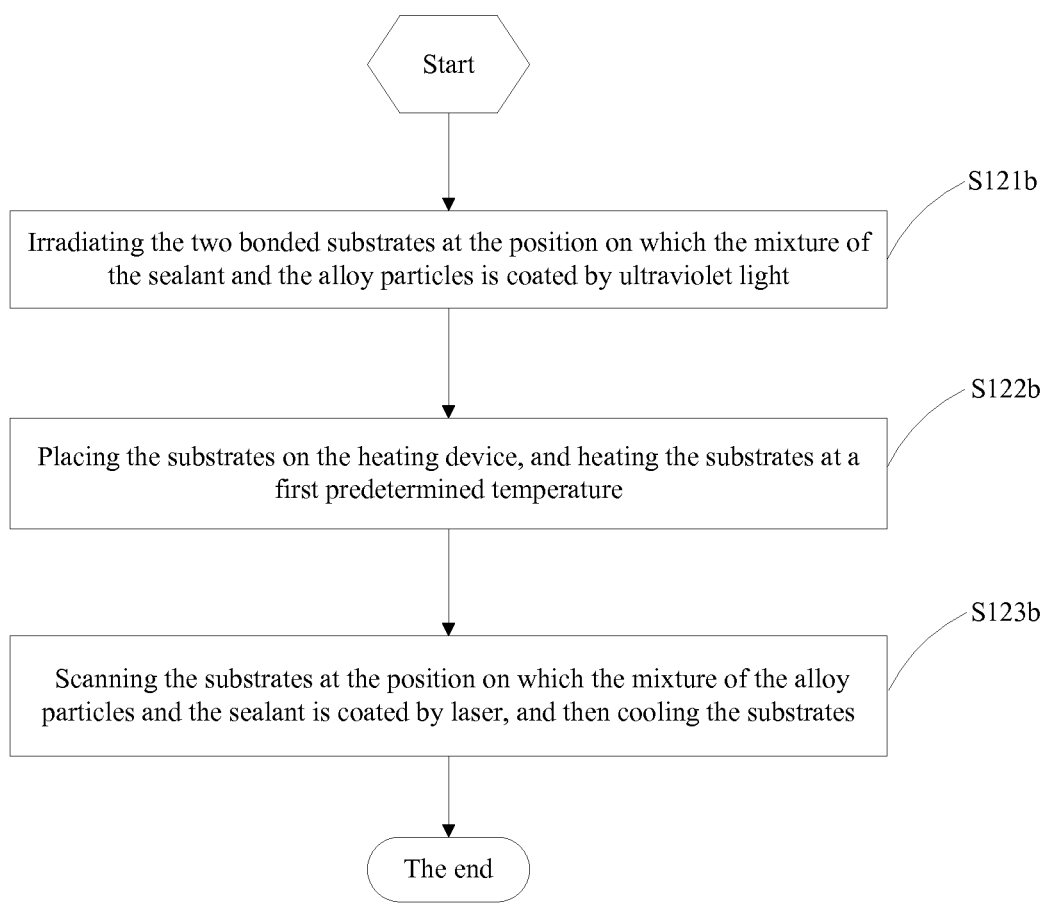
FIG. 5 is a flow chart of the step of heating the substrates of the liquid crystal panel at a high temperature of the manufacturing method of FIG. 3 in accordance with a second embodiment.

Referring to FIG. 5, the step of heating the substrates at a high temperature, in accordance with another embodiment of the present disclosure, is shown. In the embodiment, the step S12 specifically includes:

Step S121*b*, irradiating the two bonded substrates at the position on which the mixture of the sealant and the alloy particles is coated by ultraviolet light;

Step S122*b*, placing the substrates on the heating device, and heating the substrates at a first predetermined temperature;

Step S123*b*, scanning the substrates at the position on which the mixture of the alloy particles and the sealant is coated by laser, and then cooling the substrates.

At first, irradiating the substrates at the position on which the mixture of the sealant and the alloy particles is coated by ultraviolet light to partly cure the sealant. Secondly, placing the substrates on the heating device such as an oven and heating the substrates at the first predetermined temperature to completely cure the sealant. Finally, scanning the substrates at the position on which the mixture of the alloy particles and the sealant is coated by laser to melt the alloy particles, thereby forming larger alloy ones after the substrates are cooled. It is understood that the first predetermined temperature is required to be high enough to completely cure the sealant and can be adjusted according to requirements in different situations. Additionally, the heating time of the substrates can be set according to the experience of the skilled one in the art. In the embodiment, the first temperature is 120 centigrade.

Furthermore, in the mixture of the sealant and the alloy particles, the weight ratio of the alloy particles to the sealant is in the range of from 0.5:100 to 50:100. Preferably, the weight ratio ranges from 2:100 to 10:100. The alloy particles can be mixed with the sealant by a direct mixing method or via solvent. When they are mixed with the sealant by the direct mixing method, the alloy particles are mixed into the sealant by manual operation or by machines. When the alloy particles are mixed with the sealant by solvent, the alloy particles are placed together with the sealant and the solvent is added thereto to allow the alloy particles to be mixed into the sealant. After the alloy particles are mixed into the sealant, draining the solvent. In order to allow the alloy particles to be mixed into the sealant, the mixture may be at first heated to decrease the viscosity of the sealant, and further is cooled after the alloy particles are mixed into the sealant. It is noted that, during the process, the heating temperature is far lower than the melting points of the alloy particles.

Furthermore, each of the alloy particles can be substantially rotundity-shaped, ellipsoid-shaped, piece-shaped, plate-shaped, and irregularly shaped.

Furthermore, the sealant can be made of material having a number of components such as epoxy resin, curing agent, catalytic agent, photo initiator, and inorganic filling particles.

The processes of manufacturing a vertical alignment type (VA) liquid crystal panel and a twisted nematic type (TN) liquid crystal panel using the above manufacturing method are given in detail in the following description.

( _ ) The VA Type Liquid Crystal Panel

In a first embodiment: Firstly, manufacturing the first substrate by forming data lines, gate lines, a TFT array, an array pixel electrode, and an array common electrode on a glass substrate of the first substrate, and coating an alignment layer on a surface of the first substrate. Secondly, manufacturing the second substrate by forming a black matrix, a color filter layer, spacers, and a CF common electrode on a glass substrate of the second substrate, and coating another alignment layer on a surface of the second substrate. Thirdly, mixing plate-shaped alloy particles each which is made of Sn-pb alloy and has a thickness of 1 um, a length and a width respectively of 4 um with the sealant, in which the weight ratio of the alloy particles to the sealant is 2:100; coating the mixture on the edge of the first substrate after the alloy particles are mixed into the sealant; dropping the liquid crystals on the first substrate; and bonding the first substrate to the second substrate in a vacuum bonding machine. After that, irradiating the two bonded substrates by ultraviolet light at the position on which the mixture is coated to allow the sealant to be partly cured, and then placing the substrates in an oven to be heated at a temperature of 120 centigrade for an hour to allow the sealant to be cured completely, and then heating the substrates at a temperature of 150 centigrade for five minutes to melt the alloy particles, and then gradually cooling the substrates to reach the atmosphere temperature. The cooled substrates are then processed by a PSVA alignment process, and further is cut and covered by a polarization plate to form the VA type of liquid crystal panel.

In a second embodiment: Firstly, manufacturing the first substrate by forming data lines, gate lines, a TFT array, an array pixel electrode, and an array common electrode on a glass substrate of the first substrate, and coating an alignment layer on a surface of the first substrate. Secondly, manufacturing the second substrate by forming a black matrix, a color filter layer, spacers between the two substrates, and a CF common electrode on a glass substrate of the second substrate, and coating another alignment layer on a surface of the second substrate. Thirdly, mixing rotundity-shaped alloy particles made of Sn-pb alloy and having diameters ranging from 2 um to 4 um with the sealant, in which the weight ratio of the alloy particles to the sealant is 10:100; coating the mixture on the edge of the first substrate after the alloy particles are mixed into the sealant; and coating purified sealant on other positions of the first substrate. After that, the liquid crystals are dropped on the first substrate, and the first substrate is bonded to the second substrate in a vacuum bonding machine. Finally, irradiating the substrates by ultraviolet light at the position on which the mixture is coated to allow the sealant to be partly cured; placing the substrate in an oven to be heated at a temperature of 120 centigrade for an hour to allow the sealant to be cured completely; gradually cooling the substrates to reach the atmosphere temperature; scanning four corners of the substrates by laser to melt the alloy particles; and gradually cooling the substrates again to reach the atmosphere temperature after the alloy particles melt. The cooled substrates then are processed by a PSVA alignment process, and further is cut and covered by a polarization plate to form the VA type liquid crystal panel.

(=) TN Type Liquid Crystal Panel

In a first embodiment: Firstly, manufacturing the first substrate by forming data lines, gate lines, a TFT array, an array pixel electrode, and an array common electrode on a glass substrate of the first substrate, coating an alignment layer on a surface of the first substrate, and processing the first substrate using a friction alignment process. Secondly, manufacturing a second substrate by forming a black matrix, a color filter layer, spacers between the two substrates, and a CF common electrode on a second glass substrate of the second substrate, coating another alignment layer on a surface of the second substrate, and processing the first substrate using a friction alignment process. After that, mixing plate-shaped alloy particles made of Sn-pb-Bi—Cr alloy and having diameters ranging from 2 um to 4 um with the sealant, in which the weight ratio of the alloy particles to the sealant is 5:100, and coating the mixture on the edge of the first substrate after the alloy particles are mixed into the sealant. Liquid crystals are dropped on the first substrate, and the first substrate is bonded to the second substrate in a vacuum bonding machine. After that, irradiating the substrates by ultraviolet light at the position on which the mixture is coated to allow the sealant to be partly cured, placing the substrate in an oven to be heated at a temperature of 120 centigrade for an hour to allow the sealant to be cured completely, heating the substrates at a temperature of 150 centigrade for 5 minutes to completely melt the alloy particles, and gradually cooling the substrates to reach the atmosphere temperature. The substrates are further cut and covered by a polarization plate to form the TN type liquid crystal panel.

In a second embodiment: Firstly, manufacturing the first substrate by forming data lines, gate lines, a TFT array, an array pixel electrode, and an array common electrode on a glass substrate of the first substrate, coating an alignment layer on a surface of the first substrate, and processing the first substrate using a friction alignment process. Secondly, manufacturing a second substrate by forming a black matrix, a color filter layer, spacers between the two substrates, and a CF common electrode on a second glass substrate of the second substrate, coating another alignment layer on a surface of the second substrate, and processing the second substrate using a friction alignment process. After that, mixing rotundity-shaped alloy particles made of In—Sn alloy and having diameters ranging from 3 um to 4 um with the sealant, in which the weight ratio of the alloy particles to the sealant is 3:100, and coating the mixture on the edge of the first substrate after the alloy particles are mixed into the sealant. Liquid crystals are dropped on the first substrate, and the first substrate is bonded to the second substrate in a vacuum bonding machine. After that, irradiating the substrates by ultraviolet light on the position on which the mixture is coated to allow the sealant to be partly cured, placing the substrates in an oven to be heated at a temperature of 120 centigrade for an hour to allow the sealant to be cured completely, cooling the substrates gradually to reach the atmosphere temperature, and scanning the substrates at the position on which the mixture is coated by laser to melt the alloy particles. After the alloy particles melt, cooling the substrates gradually to reach the atmosphere temperature. The cooled substrates then are further cut and covered by a polarization plate to form the TN type liquid crystal panel.

Figure 6:
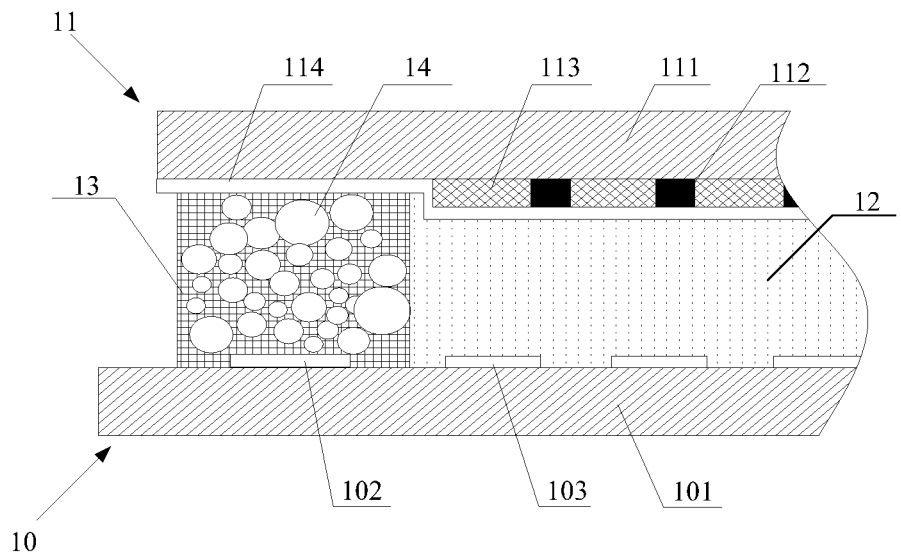
FIG. 6 is a schematic view of the semi-finished liquid crystal panel after the process of bonding a first substrate and a second substrate of the liquid crystal panel.
Figure 7:
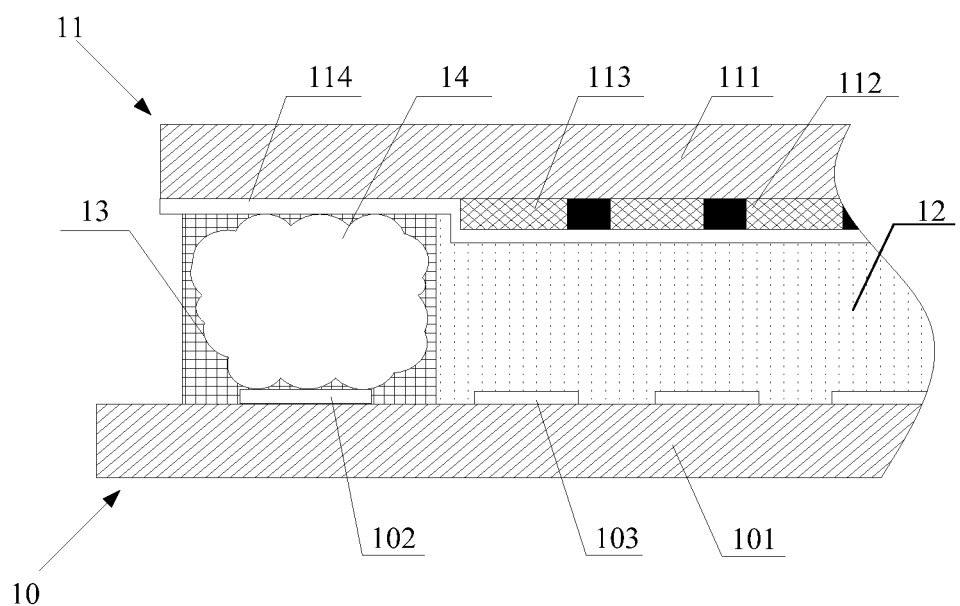
FIG. 7 is a schematic view of the semi-finished liquid crystal panel after the process of heating the bonded first substrate and second substrate at a high temperature.

Referring to FIGS. 6 and 7, in which FIG. 6 is a schematic view of the semi-finished liquid crystal panel after the process of bonding the first substrate and the second substrate and FIG. 7 is a schematic view of the semi-finished liquid crystal panel after the process of heating the bonded first substrate and second substrate at a high temperature. The liquid crystal panel includes a first substrate 10, a second substrate 11, and a liquid crystal layer 12 sandwiched between the first substrate 10 and the second substrate 11. A sealant 13 is coated on the first substrate 10. A number of alloy particles having low melting points are mixed with the sealant 13.

Specifically, the first substrate 10 includes a first glass substrate 101, and an array common electrode 102 and a number of array pixel electrodes 103 formed on the second glass substrate 101. The second substrate 11 includes a second glass substrate 111, and a black matrix 112, a color filter layer 113, and a CF common electrode 114 formed on the second glass substrate 111. After the first substrate 10 and the second substrate 11 are manufactured, the alloy particles having low melting points are mixed with the sealant, and the mixture is coated on an edge of the first substrate 10. In some embodiments, the mixture of the alloy particles and the sealant is coated on a predetermined position (in some embodiments, the array common electrode 102 of the first substrate 10) on the edge of the first substrate 10, while purified sealant (that is, sealant not being mixed with the alloy particles) is coated on other positions on the edge of the first substrate 10. The alloy particles are of different size and the diameter of each of the alloy particles are less than or equal to the distance between the first substrate 10 and the second substrate 11. After the mixture of the alloy particles and the sealant is coated on the first substrate 10 and liquid crystals are dropped thereon, the first substrate 10 is bonded to the second substrate 11. The bonded first and second substrates 10, 11 then are heated to cure the sealant and to melt the alloy particles. The melted alloy particles are capable of forming relatively larger alloy ones after being cooled, as shown in FIG. 7.

By mixing the alloy particles having low melting points with the sealant, coating the mixture on the predetermined position of the first substrate, and heating the mixture at a high temperature in the following process, the separate alloy particles can melt to form larger alloy ones, thereby conducting the common electrodes of the two substrates of the liquid crystal panel. Therefore, the manufacturing method of the present disclosure can prevent the situation where the present golden balls pierce the common electrodes and further cause the short circuit of the circuit on the substrate, which improves the yield rate of the liquid crystal panel. Additionally, after the separate alloy particles melt, the contacting area between the alloy particles and the common electrodes are increased. Also, the contacting resistance between alloy particles, and the contacting resistance between the alloy particles and the substrate are reduced, which improves the conductivity between the common electrodes of the two substrates. Since each of the alloy particles is simply structured, and the manufacturing process thereof is also simple, the manufacturing cost of the liquid crystal panel thus can be reduced.

Furthermore, in the mixture of the sealant and the alloy particles, the weight ratio of the alloy particles to the sealant ranges from 0.5:100 to 50:100. Preferably, the weight ratio ranges from 2:100 to 10:100. The alloy particles can be mixed with the sealant by a direct mixing method or via solvent. When being mixed with the sealant by the direct mixing method, the alloy particles are mixed into the sealant by manual operation or by machines. When the alloy particles are mixed with the sealant by solvent, the alloy particles are placed together with the sealant and the solvent is added thereto to allow the alloy particles to be mixed into the sealant. After the alloy particles are mixed into the sealant, the solvent can be drained. In order to allow the alloy particles to be mixed into the sealant, the mixture may be heated to decrease the viscosity of the sealant. After the alloy particles are mixed into the sealant, the mixture is cooled. It is noted that, during the process, the heating temperature is far lower than the melting points of the alloy particles.

Furthermore, each of the alloy particles can be substantially rotundity-shaped, ellipsoid-shaped, piece-shaped, plate-shaped, and irregularly shaped.

Furthermore, the sealant can be made of material having a number of components such as epoxy resin, curing agent, catalytic agent, photo initiator, and inorganic filling particles.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:
1. A manufacturing method of a liquid crystal panel, comprising:
manufacturing a first substrate and a second substrate;
mixing sealant with a plurality of alloy particles having low melting points, coating the mixture on the first substrate, and dropping liquid crystals on the first substrate; and
bonding the first substrate and the second substrate, heating the two bonded substrates, and then cooling the two bonded substrates;
wherein the mixture of the sealant and the alloy particles is coated on an edge of the first substrate, or is coated on four corners of the first substrate, or is coated on a predetermined position on which the mixture is capable of conducting common electrodes of the first substrate and the second substrate; and
wherein the step of heating the two bonded substrates and then cooling the two bonded substrates comprises:
irradiating the two bonded substrates at a position on which the mixture is coated by ultraviolet light;
placing the substrates on a heating device and heating the substrates at a first predetermined temperature; and
scanning the substrates at the position on which the mixture is coated and then cooling the substrates.
2. The manufacturing method as claimed in claim 1, wherein the weight ratio of the alloy particles to the sealant ranges from 0.5:100 and 50:100.
3. The manufacturing method as claimed in claim 2, wherein the weight ratio of the alloy particles to the sealant ranges from 2:100 and 10:100.
4. The manufacturing method as claimed in claim 2, wherein the alloy particles are placed together with the sealant and are mixed into the sealant by manual operation or by machines.
5. The manufacturing method as claimed in claim 2, wherein the mixing step comprises:
mixing the alloy particles with the sealant, and adding a certain amount of solvent into the mixture; and
after the alloy particles are mixed into the sealant, heating the mixture at a temperature lower than the melting point of the alloy particle and draining the solvent.
6. The manufacturing method as claimed in claim 1, wherein a diameter of each of the alloy particles is less than or equal to the distance between the first substrate and the second substrate.
7. The manufacturing method as claimed in claim 1, wherein the alloy particles are rotundity-shaped, or ellipsoid-shaped, or piece-shaped, or plate-shaped.
8. The manufacturing method as claimed in claim 1, wherein the alloy particles are made of one or more kinds of material selected from the group consisting of Bi, Sn, Pb, In, and Cr.
9. A manufacturing method of a liquid crystal panel, comprising:
manufacturing a first substrate and a second substrate;
mixing sealant with a plurality of alloy particles having low melting points, coating the mixture on the first substrate, and dropping liquid crystals on the first substrate; and bonding the first substrate and the second substrate, heating the two bonded substrates, and then cooling the two bonded substrates;

wherein the weight ratio of the alloy particles to the sealant ranges from 0.5:100 and 50:100; and wherein the mixing step comprises:
mixing the alloy particles with the sealant, and adding a certain amount of solvent into the mixture; and
after the alloy particles are mixed into the sealant, heating the mixture at a temperature lower than the melting point of the alloy particle and draining the solvent.

* * * * *